(12) United States Patent
Kanata

(10) Patent No.: US 7,614,794 B2
(45) Date of Patent: Nov. 10, 2009

(54) ROLLING BEARING DEVICE

(75) Inventor: Atsushi Kanata, Kashiwara (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 38 days.

(21) Appl. No.: 12/076,940

(22) Filed: Mar. 25, 2008

(65) Prior Publication Data

US 2008/0240637 A1    Oct. 2, 2008

(30) Foreign Application Priority Data

Mar. 26, 2007   (JP) ............................ P2007-078832

(51) Int. Cl.
*F16C 33/76* (2006.01)
*F16J 15/32* (2006.01)

(52) U.S. Cl. .................. 384/477; 384/484; 384/459; 277/572

(58) Field of Classification Search .............. 384/477, 384/478, 479, 480, 481, 482, 483, 484, 485, 384/486, 487, 488, 489; 277/572, 573, 574, 277/576, 577

See application file for complete search history.

(56) References Cited

U.S. PATENT DOCUMENTS

| 2,977,138 | A | * | 3/1961 | Brittain, Jr. | 277/552 |
| 3,396,975 | A | * | 8/1968 | Otto | 277/573 |
| 3,494,682 | A | * | 2/1970 | Keller | 277/551 |
| 5,017,025 | A | * | 5/1991 | Williams | 384/584 |
| 5,024,449 | A | * | 6/1991 | Otto | 277/353 |
| 5,380,102 | A | * | 1/1995 | Sink | 384/484 |
| 6,126,321 | A | * | 10/2000 | Fetty et al. | 384/459 |

FOREIGN PATENT DOCUMENTS

JP    2003-269471    9/2003

* cited by examiner

*Primary Examiner*—Thomas R Hannon
*Assistant Examiner*—Justin Krause
(74) *Attorney, Agent, or Firm*—McGinn IP Law Group, PLLC

(57) ABSTRACT

A rolling bearing device of the invention has inner rings, an outer ring, and a sealing unit having a seal case fixed to the outer ring. The seal case is internally fitted to an annular corner formed between a shoulder inner peripheral surface of the outer ring, and a seal groove in a state where the diameter of a fixed portion is reduced elastically, and is fixed to the outer ring in a state where the annular corner and an outer peripheral surface of the fixed portion are in a line contact with each other.

3 Claims, 4 Drawing Sheets

ROLLING BEARING DEVICE

BACKGROUND OF THE INVENTION

1. Field of the Invention

The present invention relates to a rolling bearing device that supports an axle of a railroad vehicle, etc.

2. Related Art

As a bearing device that rotatably supports an axle of a railroad vehicle, there is, for example, a rolling bearing device including a double-row tapered roller bearing at an end of the axle, and sealing units disposed outside axial opposite ends of the tapered double-row tapered roller bearing.

FIG. 4 is a partial sectional view showing an example of a conventional rolling bearding device to be used for a railroad vehicle. This rolling bearing device 100 has an inner ring 101 that is externally fitted to an axle S, an outer ring 102 fixed to the vehicle, a tapered roller 103 disposed between the inner and outer rings 101 and 102, and a sealing unit 104 for sealing a gap between the inner and outer rings. The sealing unit 104 has a seal case 105 fixed to the outer ring, and a sealing member 106 that is held in the seal case 105 to seal a gap formed along with the axle S. The seal case 105 is fixed to an end of the outer ring 102, and has a tubular fixed portion 105a that is fixedly pressed-fitted into an inner periphery of a shoulder 102a of the outer ring 102, and a tubular holding portion 105b that extends outward of the outer ring 102 from the fixed portion 105a, and holds the sealing member 106 axially outside an end face of the outer ring 102.

Further, a protruding portion 105c that protrudes radially outward is formed at an end of the fixed portion 105a. The protruding portion 105c is engaged with a seal groove 102b formed in the shoulder 102a, thereby regulating axial movement of the seal case 105. (See, for example, JP-A-2003-269471.)

In the rolling bearing device in the above conventional example, the sealing unit 104 is configured such that a gap between the seal case 105 and the axle S is sealed by the sealing member 106, and a gap between the seal case 105 and the outer ring 102 is sealed by the surface contact between an inner peripheral surface of the shoulder 102a of the outer ring 102, and an outer peripheral surface of the fixed portion 105a that is press-fitted to the inner peripheral surface.

However, as described above, since the contact between the seal case 105 and the outer ring 102 is surface contact, there is a possibility that a slight gap may be formed therebetween due to a difference in surface roughness, etc.

Moreover, if the seal case 105 co-rotates with the rotation of the axle S, this co-rotation may cause the seal case 105 to rotate relative to the outer ring 102. As a result, there is a probability that the outer peripheral surface of the fixed portion 105a and the inner peripheral surface of Shoulder 102a are rubbed mutually and worn, and a gap may be formed therebetween.

As described above, if a gap is formed between the seal case 105 and the outer ring 102, dust, etc. may enter the inside of the rolling bearing device, or grease inside the bearing device may leak out, and thereby the durability of the rolling bearing device may be deteriorated. For this reason, measures of that enhance the sealing performance between the outer ring 102 and the seal case 105 are expected.

SUMMARY OF THE INVENTION

The invention has been made in consideration of the above problems. It is therefore an object of the invention to provide a rolling bearing device capable of further enhancing the sealing performance of a sealing unit, thereby suppressing deterioration of durability.

In order to achieve the above object, a rolling bearing device according to the invention includes:

an inner ring;

an outer ring in which a seal groove extending along a peripheral direction is formed in a shoulder inner peripheral surface;

rolling elements disposed rollably between the inner and outer rings; and a sealing unit that seals a gap between the inner and outer rings, the sealing unit including a tubular fixed portion that is fixedly inserted toward the shoulder inner peripheral surface of the outer ring, and a seal case having a holding portion that extends outward of the outer ring from the fixed portion, and holds a sealing member that seals the gap between the inner and outer rings axially outside an end face of the outer ring, wherein the seal case is internally fitted to an annular corner formed between the shoulder inner peripheral surface of the outer ring, and the seal groove in a state where the diameter of the fixed portion is reduced elastically, and is fixed to the outer ring in a state where the annular corner and an outer peripheral surface of the fixed portion are in a line contact with each other.

According to the rolling bearing device configured as described above, since the fixed portion is internally fitted to the annular corner in a state where its diameter is reduced elastically, the fixed portion has an elastic restoring force that tends to restore its diameter to an original state. For this reason, the outer peripheral surface of the fixed portion will contact the annular corner while being elastically pressed by this elastic restoring force. Moreover, since the contact surface between the outer peripheral surface of the fixed portion, and the annular corner has line contact, the outer peripheral surface of the fixed portion is pressed against the annular corner by high surface pressure combined with the elastic restoring force, so that the outer peripheral surface of the fixed portion and the annular corner can be brought into close contact with each other without a gap therebetween. Moreover, for example, even if the seal case rotates relative to the outer ring, and friction occurs between the outer peripheral surface of the fixed portion, and the annular corner, the outer peripheral surface of the fixed portion is elastically pressed against the annular corner. Thus, it is possible to prevent generation of a gap. From the above, it is possible to increase the sealing performance between the outer ring and the seal case. As a result, it is possible to further increase the sealing performance as the whole sealing unit.

In the above rolling bearing device, preferably, the outer peripheral surface of the fixed portion is a tapered surface whose diameter increases toward a tip of the fixed portion inserted toward the shoulder inner peripheral surface of the outer ring.

In this case, the outer peripheral surface of the fixed portion of the seal case can be brought into close contact with the annular corner of the outer ring at the shoulder inner peripheral surface.

Further, in the above rolling bearing device, preferably, the tip of the fixed portion is provided with a projection that protrudes radially outward, and is engaged with the seal groove provided in the inner peripheral surface of the outer ring.

In this case, the projection can be engaged with the seal groove to regulate the axial movement of the seal case and prevent the sealing unit from being separating from the outer ring, for example, in a case where the seal case tends to move axially outward due to an external factor.

According to the rolling bearing device of the invention, deterioration of durability can be suppressed by further enhancing the sealing performance of the sealing unit.

DETAILED DESCRIPTION OF THE PREFERRED EMBODIMENTS

Figure 1:
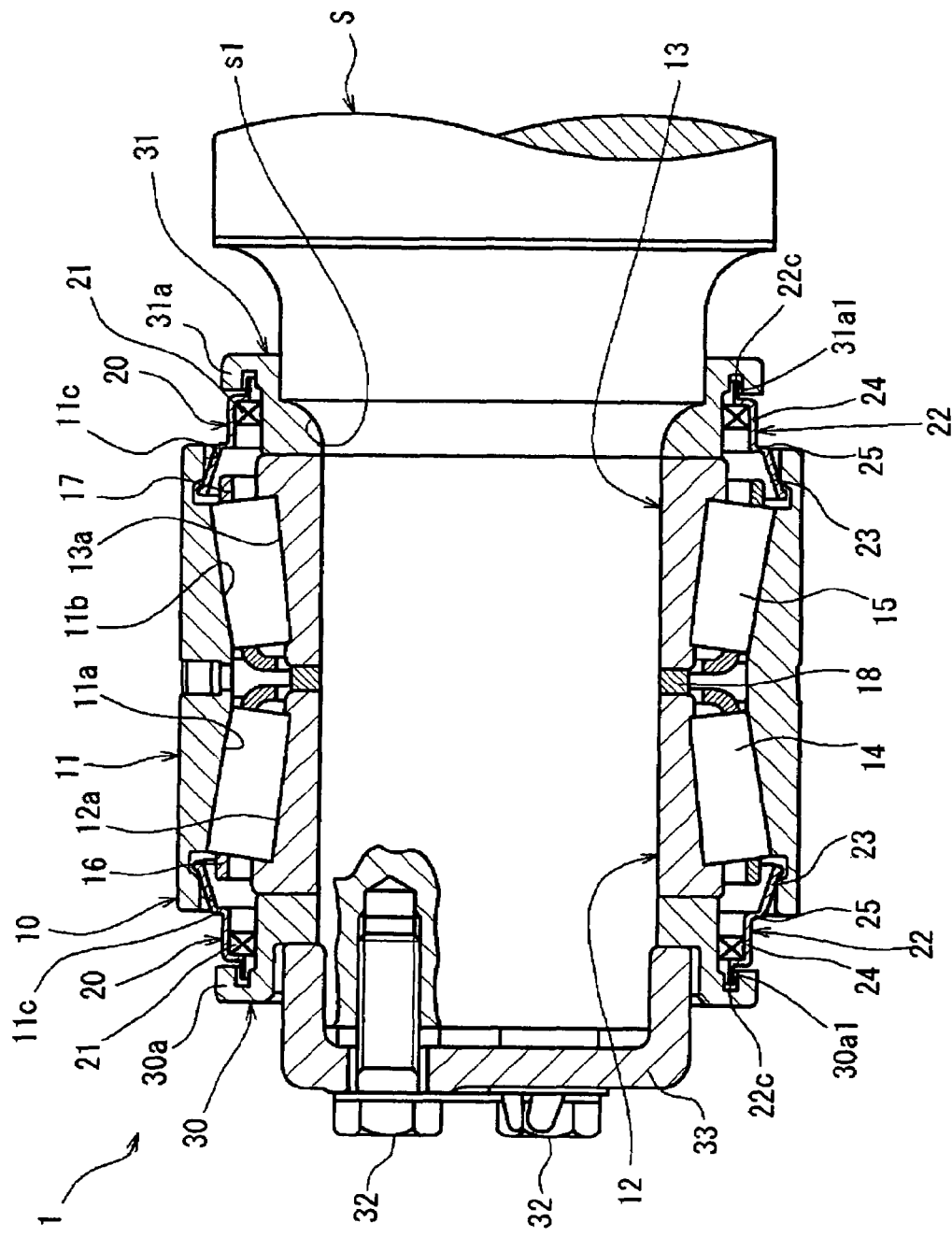
FIG. 1 is a sectional view showing the configuration of a rolling bearing device for railroad vehicles according to a first embodiment of the invention.

Next, preferable embodiments of the invention will be explained referring to the accompanying drawings. FIG. 1 is a sectional view showing the configuration of a rolling bearing device for railroad vehicles according to a first embodiment of the invention. This rolling bearing device 1 supports an axle S of a railroad vehicle rotatably with respect to a vehicle body.

In FIG. 1, the rolling bearing device 1 has a double-row tapered roller bearing 10 that is externally fitted and fixed to an end of the axle S to which a wheel of the railroad vehicle is fixed so as to be integrally rotatable, and a pair of sealing units 20 that seal both ends of this tapered roller bearing 10.

The tapered roller bearing 10 includes an outer ring 11 that is fixed to the vehicle, a pair of inner rings 12 and 13 that are integrally rotatably fixed to the axle S, tapered rollers 14 and 15 as rolling elements that are disposed rollably in double rows between the inner and outer rings, and cages 16 and 17 that holds the tapered rollers 14 and 15, respectively.

The outer ring 11 is a member that is integrally formed in a cylindrical shape using alloy steel for a machine structure, bearing steel, etc., and an inner peripheral surface thereof is provided with a pair of outer ring raceways 11a and 11b. The pair of inner rings 12 and 13 are members that are formed in a cylindrical shape using alloy steel for a machine structure, bearing steel, etc., and are externally fitted and fixed to the axle S. An outer peripheral surface of the inner rings 12 and 13 is provided with inner ring raceways 12a and 13a that face the above outer ring raceways 11a and 11b, respectively. The above-mentioned tapered rollers 14 and 15 are rollably disposed between the outer ring raceways 11a and 11b and the inner ring raceways 12a and 13a, and the outer ring 11 and the inner rings 12 and 13 are rotatable relative to each other. Further, an annular spacer 18 is disposed between the pair of inner rings 12 and 13.

The sealing units 20 are fixed to axial opposite ends of the outer ring 11, and includes a sealing member 21 for sealing a gap between the inner and outer rings 11, 12, and 13, and a seal case 22 that holds the sealing member 21 axially outside the outer ring 11.

The seal case 22 is, for example, a member that is formed by press-working cold-rolled sheet steel, such as SPCC, and has a tubular fixed portion 23 that is inserted into and fixed to an inner periphery of a shoulder 11c of the outer ring 11, a holding portion 24 that extends axially outward of the outer ring 11 from the fixed portion 23, and holds the sealing member 21 axially outside an end face of the outer ring 11, and an annular portion 25 that connects the fixed portion 23 and the holding portion 24.

The sealing member 21 is fixed to and held by an inner peripheral surface of the holding portion 24, and has a seal lip (not shown) that comes into sliding contact with an outer peripheral surface of an annular member 30 (31), which is externally fitted and fixed to the axle S, to be described later. By the seal lip, the sealing member 21 seals a gap between the seal case 22 that is inserted into and fixed to the outer ring 11, and the outer peripheral surface of the annular member 30 (31), and seals an annular opening between the inner rings 12 and 13 and the outer ring 11.

In addition, an aspect in which the seal case 22 is inserted into and fixed to the outer ring 11 will be explained in detail later.

At both ends of the rolling bearing device 1, the above-mentioned annular members 30 and 31 that are integrally rotatably and externally fitted and fixed to the axle S are disposed. The annular member 31 disposed at a base end of the axle S abuts on a stepped portion s1 that is formed in the axle S, and is thereby restrained from moving toward the axial base end. Moreover, a lid member 33 fixed with bolts 32 is disposed at a distal end of the axle S. This lid member 33 is disposed to abut on the annular member 30 disposed at the distal end of the axle S, and sandwiches the rolling bearing device 1, and the annular members 30 and 31 disposed at both ends thereof along with the stepped portion s1 of the axle S, and holds an axial position of the rolling bearing device 1.

Further, annular salient portions 30a and 31a that protrude radially outward are formed in the annular members 30 and 31, respectively. Annular grooves 30a1 and 31a1 into which a tubular portion 22c extending axially from the tip of the holding portion 24 of the seal case 22 is inserted are formed in the annular salient portions 30a and 31a, respectively. The annular grooves 30a1 and 31a1, and the tubular portion 22c inserted thereto constitute a labyrinth seal, thereby further increasing the sealing performance between the seal case 22 and the annular members 30 and 31.

Next, an aspect in which the above sealing units 20 are inserted into and fixed to the outer ring 11 will be explained.

Figure 2:
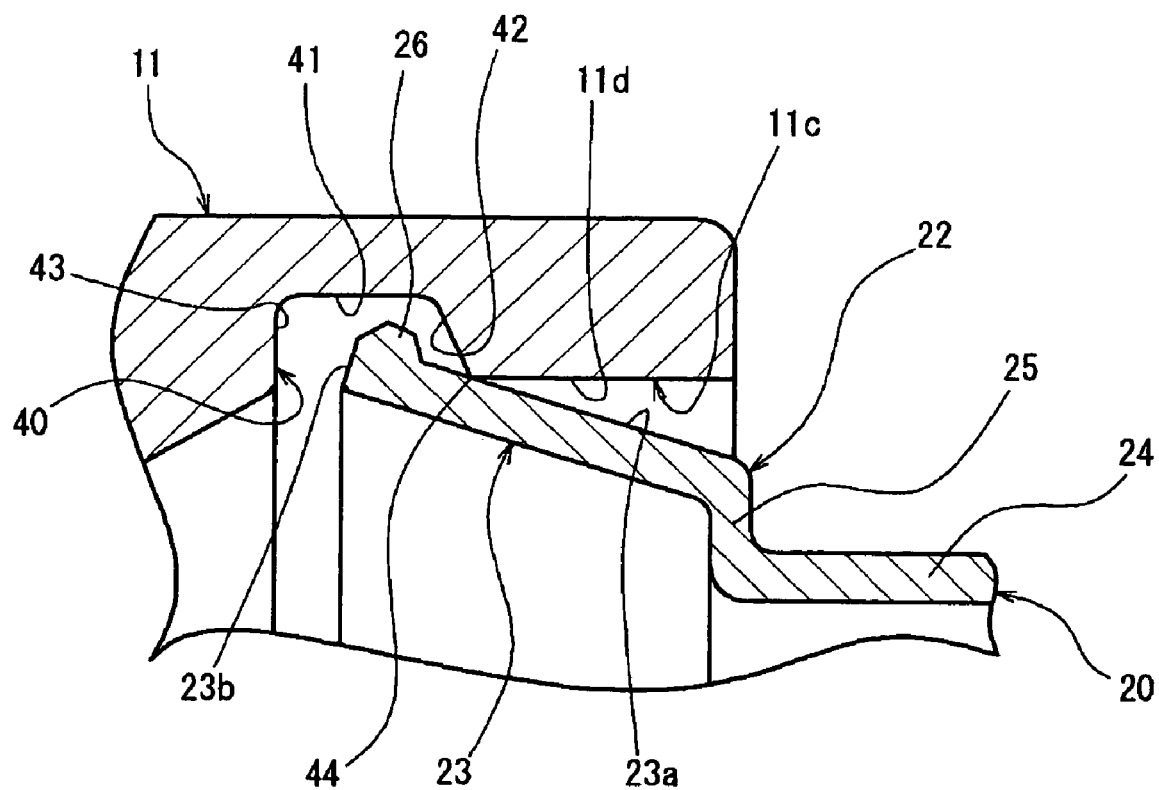
FIG. 2 is a sectional view showing chief portions of a sealing unit located at a base end of an axle in FIG. 1 in an enlarged manner.

FIG. 2 is a sectional view showing chief portions of the sealing unit 20 located at the base end of the axle S in FIG. 1 in an enlarged manner. In the drawing, a seal groove 40 along a peripheral direction is formed in an inner peripheral surface 11d of the shoulder 11c of the outer ring 11. The seal groove 40 is formed so as to be recessed radially outward from the inner peripheral surface 11d of the shoulder 11c, and has a bottom surface 41, a first wall surface 42 that is connected to the inner peripheral surface 11d from the bottom surface 41, and a second wall surface 43 that faces the first wall surface 42.

An annular corner 44 is formed between the inner peripheral surface 11d of the shoulder 11c, and the first wall surface 42, and touches an outer peripheral surface 23a of the fixed portion 23 of the seal case 22.

In the fixed portion 23 of the seal case 22, as described above, the outer peripheral surface 23a is formed as a tapered surface whose diameter increases toward the distal end 23b of the fixed portion 23 with the annular portion 25 as a base end in order to make the outer peripheral surface 23a touch the annular corner 44.

Further, the distal end 23b of the fixed portion 23 is provided with a projection 26 that protrudes radially outward. The projection 26 can be engaged with the seal groove 40 to regulate the axial movement of the seal case 22, for example, in a case where the seal case 22 tends to move axially outward due to an external factor. This can prevent the sealing unit 20 from being separated from the outer ring 11.

The fixed portion 23 is internally fitted and fixed to the annular corner 44 at the inner periphery of the shoulder 11c in a state where the diameter of the whole fixed portion 23 is reduced elastically. Further, the outer peripheral surface 23a of the fixed portion 23 touches the annular corner 44 in the state where it does not contact the inner peripheral surface 11d of the shoulder, and thus, the outer peripheral surface 23a and the annular corner 44 come into line contact with each other.

In this embodiment, by forming the outer peripheral surface 23a of the fixed portion 23 as a tapered surface whose diameter increases toward the distal end 23b as described above, the outer peripheral surface 23a is prevented from contacting the shoulder inner peripheral surface 11d of the outer ring 11, which is formed as a cylinder surface that extends axially, and thus, the outer peripheral surface 23a and the annular corner 44 are in line contact with each other. By forming the outer peripheral surface 23a of the fixed portion 23 whose diameter increases toward the distal end 23b like this, it becomes easy to bring the outer peripheral surface 23a into line contact with the annular corner 44.

In addition, the taper angle of the outer peripheral surface 23a is set to such an angle that slipping or the like does not easily shift the fixed portion 23 axially in a state where the outer peripheral surface 23a touches the annular corner 44.

As described above, the fixed portion 23 is fixed to the outer ring 11 by internally fitting the outer peripheral surface 23a to the annular corner 44 in line contact therewith. Accordingly, the seal case 22 (sealing unit 20) is fixed to the outer ring 11.

According to the rolling bearing device 1 configured as described above, since the fixed portion 23 is internally fitted to the annular corner 44 in a state where its diameter is reduced elastically, the fixed portion has an elastic restoring force that tends to restore its diameter to an original state. For this reason, the outer peripheral surface 23a of the fixed portion 23 will contact the annular corner 44 while being elastically pressed by this elastic restoring force. Moreover, since the contact surface between the outer peripheral surface 23a of the fixed portion 23, and the annular corner 44 has line contact, the outer peripheral surface 23a of the fixed portion 23 is pressed against the annular corner 44 by high surface pressure combined with the elastic restoring force, so that the outer peripheral surface 23a and the annular corner 44 can be brought into close contact with each other without a gap therebetween. Moreover, for example, with the rotation of the axle S, even if the seal case 22 co-rotates, the seal case 22 rotates relative to the outer ring 11, and friction occurs between the outer peripheral surface 23a of the fixed portion 23, and the annular corner 44, the outer peripheral surface 23a is elastically pressed against the annular corner 44. It is thus possible to prevent generation of a gap. From the above, according to the rolling bearing device 1 of this embodiment, it is possible to increase the sealing performance between the outer ring 11 and the seal case 22 to thereby increase the sealing performance as the whole sealing unit 20. As a result, degradation of the durability of the rolling bearing device 1 can be suppressed.

Figure 3:
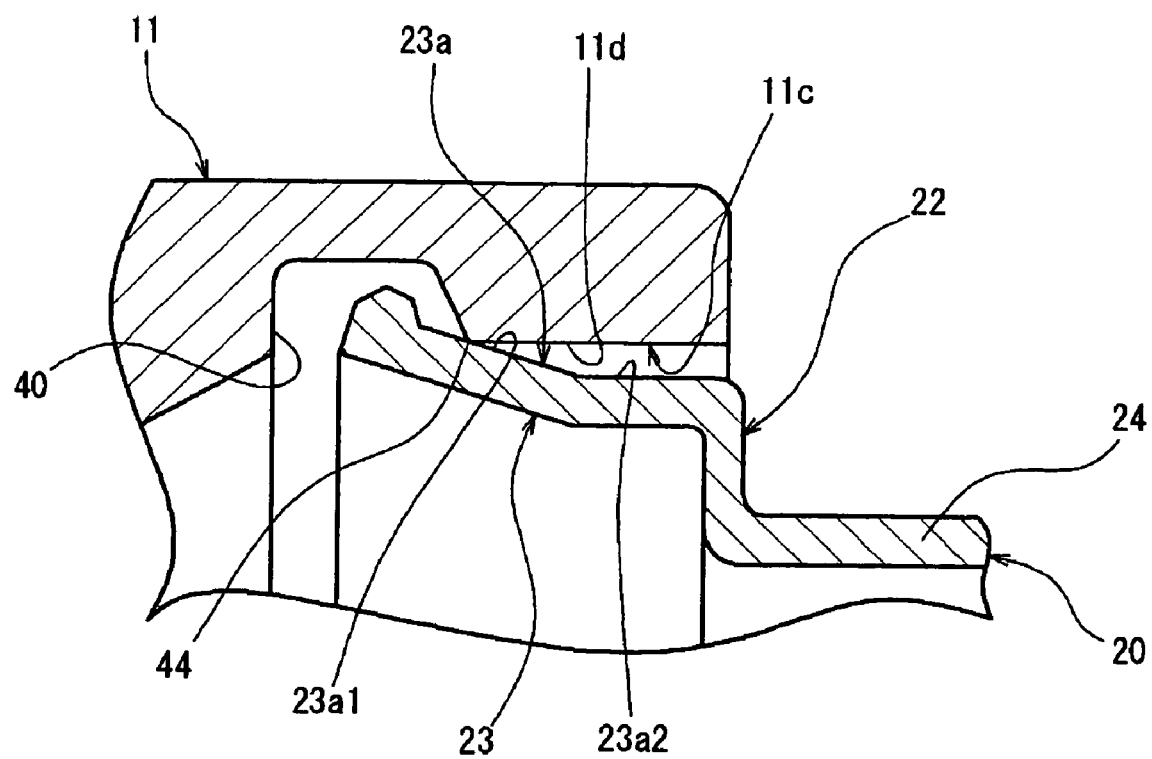
FIG. 3 is a sectional view showing chief portions of a rolling bearding device according to another embodiment.
Figure 4:
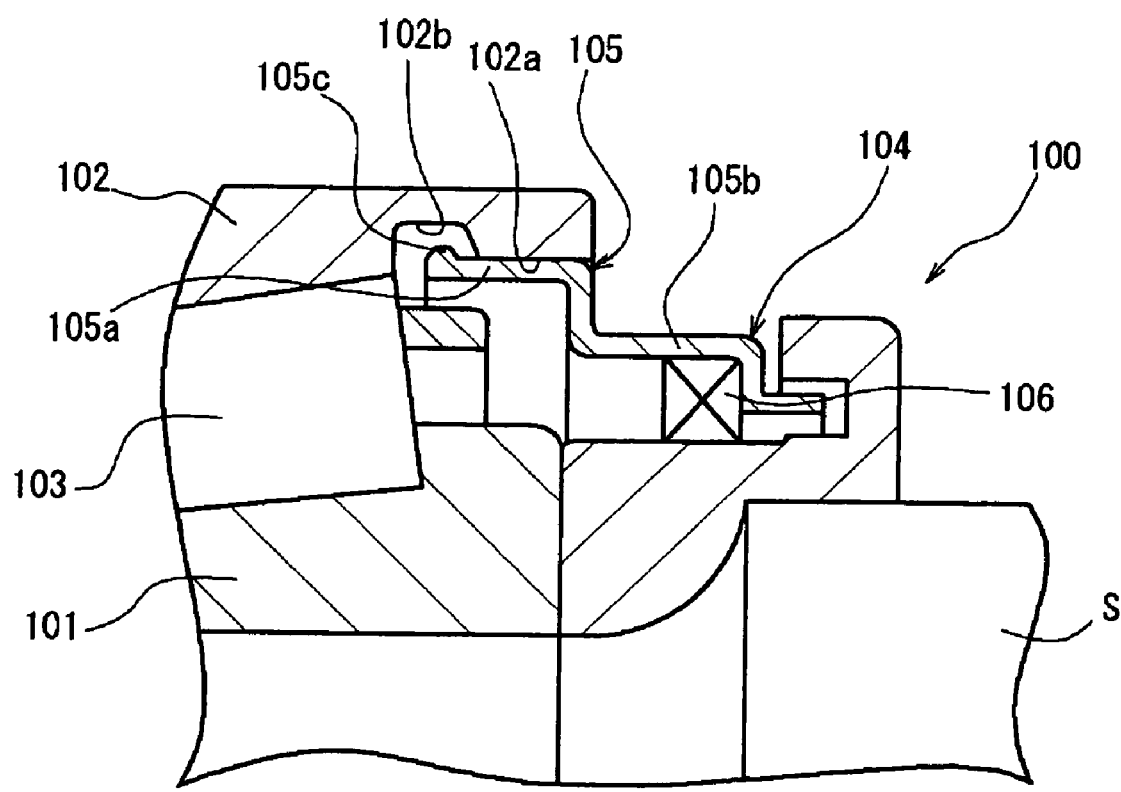
FIG. 4 is a partial sectional view showing an example of a conventional rolling bearding device to be used for a railroad vehicle.

In addition, the invention is not limited to the above embodiment. For example, a case where the outer peripheral surface 23a of the fixed portion 23 of the seal case 22 is made into a uniform tapered surface is illustrated in the above embodiment. However, for example, as shown in FIG. 3, if only the portion of the outer peripheral surfaces 23a that touches the annular corner 44 of the outer ring 11 is made into a tapered surface such that only the distal end of the outer peripheral surfaces 23a that touches the annular corner 44 of the outer ring 11 is formed as a tapered surface 23a1, and the other portion is formed as a cylindrical surface 23a2 that extends axially, the shape of the other portion is not particularly limited if it does not contact the shoulder inner peripheral surface 11d of the outer ring 11.

What is claimed is:

1. A rolling bearing device comprising:
   an inner ring;
   an outer ring in which a seal groove extending along a peripheral direction is formed in a shoulder inner peripheral surface;
   rolling elements disposed rollably between the inner and outer rings; and
   a sealing unit that seals a gap between the inner and outer rings, the sealing unit including a tubular fixed portion that is fixedly inserted toward the shoulder inner peripheral surface of the outer ring, and a seal case having a holding portion that extends outward of the outer ring from the fixed portion, and holds a sealing member that seals the gap between the inner and outer rings axially outside an end face of the outer ring,
   wherein the seal case is internally fitted to an annular corner formed between the shoulder inner peripheral surface of the outer ring, and the seal groove in a state where the diameter of the fixed portion is reduced elastically, and is fixed to the outer ring in a state where the annular corner and an outer peripheral surface of the fixed portion are in a line contact with each other.

2. The rolling bearing device according to claim 1, wherein the outer peripheral surface of the fixed portion is a tapered surface whose diameter increases toward a tip of the fixed portion inserted toward the shoulder inner peripheral surface of the outer ring.

3. The rolling bearing device according to claim 1, wherein the tip of the fixed portion is provided with a projection that protrudes radially outward, and is engaged with the seal groove provided in the inner peripheral surface of the outer ring.

* * * * *